United States Patent [19]

Ardito et al.

[11] Patent Number: 5,705,086
[45] Date of Patent: Jan. 6, 1998

US005705086A

[54] REFRIGERATION OILS COMPRISING ESTERS OF HINDERED ALCOHOLS

[75] Inventors: Susan C. Ardito, Ocean; Henry Ashjian, E. Brunswick; G. James Johnston, Mullica Hill, all of N.J.

[73] Assignee: Mobil Oil Corporation, Fairfax, Va.

[21] Appl. No.: 633,266

[22] Filed: Apr. 16, 1996

[51] Int. Cl.$^6$ ............... C09K 5/04; C10M 105/38
[52] U.S. Cl. ............ 252/68; 508/485; 62/84; 62/502; 62/468
[58] Field of Search ............. 252/68; 508/485; 554/227; 560/182, 189, 231, 263, 264; 62/84, 502, 468

[56] References Cited

U.S. PATENT DOCUMENTS

| | | | |
|---|---|---|---|
| 5,021,179 | 6/1991 | Zehler et al. | 252/68 |
| 5,188,750 | 2/1993 | Kogure et al. | 282/70 |
| 5,395,544 | 3/1995 | Hagihara et al. | 252/68 |
| 5,425,890 | 6/1995 | Yudin et al. | 252/67 |
| 5,429,760 | 7/1995 | Doering et al. | 252/67 |

FOREIGN PATENT DOCUMENTS

| | | |
|---|---|---|
| 57-198736 | 12/1982 | Japan. |
| 1385026 | 2/1975 | United Kingdom. |
| WO90/12849 | 11/1990 | WIPO. |

*Primary Examiner*—Alan Diamond
*Attorney, Agent, or Firm*—Lori F. Cuomo; Dennis P. Santini

[57] ABSTRACT

Improved refrigeration lubricants useful in compression refrigeration units are esters, exhibit an excellent balance of performance characteristics, notably in the combination of good miscibility, hydrolytic stablity, wear resistance coupled with a viscosity within the range required in many commercial refrigeration units. These esters are of a hindered dihydric or trihydric alcohol such as trimethylolpentanediol and a fatty acid, where at least 80 number percent of the acyl groups are straight chain groups.

20 Claims, No Drawings

5,705,086

REFRIGERATION OILS COMPRISING ESTERS OF HINDERED ALCOHOLS

FIELD OF THE INVENTION

The present invention relates to compositions for use in refrigeration units. The compositions comprise a refrigerant and a refrigeration oil for lubricating the refrigeration unit.

BACKGROUND OF THE INVENTION

Refrigeration units, such as vapor pressure refrigeration units, have traditionally used chlorofluorocarbons (CFCs) as the refrigerant, especially for many small size units. As a result of environmental concerns, the use of alternative refrigerants (CFC replacements) is an area of major current interest. The refrigerants which are presently considered to provide the best balance of refrigerant properties with environmental acceptablity are the hydrofluorochlorocarbons (HFCs), such as 1,1,1,2-tetrafluroethane (R-134a), 1,1,2-trifluoroethane (R-143), 1,1,1-trifluoroethane (R-143a), 1,1, 1,2,2-pentafluoroethane (R-125), 1,1-difluoroethane (R-152a), and trifluoromethane (R-23) and difluoromethane. Hydrocarbons, such as propane and butane which have been previously used in certain industrial refrigeration units, are also considered more environmentally acceptable than the CFCs.

The new classes of refrigerants have posed challenges for the development of appropriate lubricants. Lubricants derived from any number of monomeric and polymeric classes of organic compounds have been developed. Organic esters constitute a preferred class of such lubricants.

The essential problem which confronts efforts to develop new refrigeration lubricants is of attaining the optimum balance of properties. A number of properties are relevant, of which adequate miscibility is probably the most important since if the lubricant is not adequately miscible with the refrigerant under the working conditions encountered in the unit, separation will occur with the result that not all the lubricant will not be carried around with the refrigerant and may accummulate in parts such as the condenser where it will not be available to lubricate the compressor; in addition, the thermal efficiency of the unit will be reduced as a result of fouling of the heat exchanger surfaces. The lubricant and the refrigerant should, in their respective relative proportion in the working fluid, remain substantially homogeneous over the entire range of working temperatures to which the working fluid is exposed during operation of the refrigeration system. For the purpose of this specification, the term "substantially homogeneous" means free from visually detectable phase separations or turbidity. The working range of a refrigeration system may, for example, vary from as low as −60° C. to as high as +175° C.

Conventional lubricants such as naphthenic mineral oils and alkylbenzenes which can be used with chlorofluorocarbon (CFC) or hydrochlorofluorocarbon (HCFC) refrigerants are not necessarily sufficiently miscible with hydrofluorocarbon (HFC) refrigerants.

Another important characteristic of the refrigeration lubricant is hydrolytic stability since the lubricant should resist degradation in the presence of trace quantities of water which may be present in the system. With the ester lubricants, increased branching of the acyl and alcohol portions of the ester tends to improve hydrolytic stability.

Esters have previously been proposed for use in compressor refrigeration systems with HFC refrigerants. For example, U.S. Pat. No. 5,395,544 (Hagihara/Kao Corporation) discloses esters for use as lubricants in vapor compression refrigeration units that utilize difluoromethane as the refrigerant. The esters are derived from a large number of possible polyhydric alcohols; similarly, the acyl group is selected from a large number of possible acyl groups, at least 95% of which are branched. See column 2, lines 24–27.

U.S. Pat. No. 5,021,179 (Zehler/Henkel Corporation) discloses ester lubricants for use with hydrofluorocarbons. The acyl groups of the esters preferably contain 1–6 carbon atoms, and contain at least one carbon atom that is bonded to at least 3 other carbon atoms by single bonds. See column 2, lines 8–13.

Generally, esters made from branched carboxylic acids such as 2-ethylhexanoic acid and/or branched alcohols such as 2-ethylhexanol exhibit superior performance in terms of miscibility with HFC refrigerants and hydrolytic stablity. The chain branching in the acyl and alcohol components of the ester is known to correlate with improved miscibility and hydrolytic stability but, on the other hand, it is disadvantageous because it increases wear. Because these structural features of the esters work counter to one another, the need persists for new refrigeration lubricants that have an optimum balnce of properties, especially of miscibility (with HFC refrigerants), hydrolytic stablity, wear resistance and satisfactory viscosity.

SUMMARY OF THE INVENTION

We have now developed improved refrigeration lubricants which are useful in vapor compression refrigeration units. These lubricants, based on certain esters, exhibit an excellent balance of performance characteristics, notably in the combination of good miscibility, hydrolytic stablity, wear resistance coupled with a viscosity within the range required in many commercial refrigeration units.

The ester refrigeration lubricants according to the invention are characterized by the following combination of properties:

Miscibility temperature*: below −35° C.
Wear (4 Ball Wear Volume, $\mu m^3$): less than 1
Hydrolytic stability ($\Delta$TAN, mg KOH/g): less than 1
* (ASHRAE Floc Point method, see below)

Normally, the viscosity (40° C.) will be less than 15 cSt and usually in the range of 4 to 30 cSt, with the viscosities for small hermetic units usually being the range of 7 to 22 cSt. viscosities of up to about 30 cSt may be used in systemts using hydrocarbon refrigerants.

The combination of low miscibility temperature with excellent hydrolytic stability and wear resistance is unexpected since, as noted above, the effects of ester structure usually work counter to one another in respect of these properties.

This unexpected combination of properties is achieved in the lubricant by the use of a diester or a triester of a hindered dihydric or trihydric alcohol which has at least one primary alcohol group and at least one secondary alcohol group, where no carbon atom that bears a hydroxy group is adjacent to either a methylene group or a methyl group. The esters are also derived from acids of 5–18 carbon atoms. To obtain the optimum balance of properties in the lubricant, particularly in terms of wear resistance, hydrolytic stability and miscibility, the esters will be formed from a combination of straight and branched chain acids, as described below. In the final ester lubricant, at least 65 percent, and preferably at least 70 or 80 percent, of the acyl groups on the ester will normally be straight chain acyl groups since these have been found to give the best wear properties.

These lubricants are used in combination with a refrigerant to make up the working fluid for the refrigeration unit, conventionally of the compression type. Normally the refrigerant will be an HFC such as R-134a, either alone or with another refrigerant such as propane or butane; hydrov\carbon refrigerants may also be used with these ester lubricants.

The invention includes a method for lubricating a vapor compression cycle heat transfer unit by contacting moving parts of the unit with these lubricants. The invention also includes a vapor compression cycle heat transfer unit containing a working fluid of a refrigerant with the lubricant.

DETAILED DESCRIPTION OF THE INVENTION

The lubricants useful in the present invention are the diesters of hindered dihydric alcohols or the triesters of hindered trihydric alcohols. These hindered alcohols have at least one primary alcohol group and at least one secondary alcohol group, and no carbon atom that bears a hydroxy group is adjacent to either a methylene group or a methyl group. Alcohols of this type include $C_7$-$C_{10}$ hindered alcohols such as 2,2,4-trimethylpentane-1,3-diol (TMPD); 2,4-dimethylpentane-1,3-diol; 2,3,5-trimethylhexane-1,4-diol; and 2,4,6-trimethylheptane-1,3,5-triol, of which 2,2,4-trimethylpentane-1,3-diol is the preferred hindered alcohol.

The carboxylic acids from which these esters are derived are $C_4$-$C_{18}$ acids as described further below which in most cases will preferably be a $C_4$-$C_9$ fatty acid. Mixtures of esters (different acids and/or alcohols) may be used to obtain the desired product viscosity and to meet the other performance specifications for a given refrigerant system.

The acyl groups in the esters will therefore contain 4–18 carbon atoms, more preferably 6–9 carbon atoms. For use with HFC refrigerants (at least about 60 weight percent HFC) the acyl groups in the ester preferably contain 4–12, preferably 4–9 carbon atoms. If the refrigerant comprises a hydrocarbon such as propane or butane, the range of carbon numbers may be increased in view of the extended miscibility of the longer chain esters with hydrocarbon refrigerants. In this case, the acyl group preferably contains 4–18, more preferably 7–18 carbon atoms. Miscibility is better with the short chain acids but, on the other hand, longer chain acids may be required for acceptable viscosity. Wear resistance as measured by the 4-Ball Wear Test is only slightly correlated with acyl group chain length.

As noted above, the straight chain alkyl groups present in the acyl group of the ester confer good wear performance. From the viewpoint of wear, therefore, the higher the proportion of straight chain acyl groups, the better is the wear performance; on the other hand, the hydrolytic stability and miscibility are improved by chain branching in the acyl groups. We have found that with the current hindered alcohols, no more than about 30 percent of the bulk fluid should be derived from branched chain esters, i.e. esters which have a branched chain ester group (acyl group), with the remainder being straight chain ester groups. For the optimum balance of wear, hydrolytic stability and miscibility, no more that 20 percent by weight of the bulk fluid should be derived from branched chain ester groups. With higher levels of branched chain ester groups, wear performance begins to degrade. Superior wear performance may be sought by using at least 90 percent or even 95 percent straight chain ester groups if other performance characteristics are maintained. The requisite degree of chain branching in the final ester lubricant is preferably achieved by blending two or more esters with different amounts of chain branching as this technique is more controllable than the use of different acid feeds being simultaneously esterified with the alcohol(s), although the esters may also be made by esterifying the alcohol(s) with a mixed acid feed. Since the polyhydroxy alcohols used for making the estrs contain at least two esterifiable hydroxyl groups, the esters resulting from the use of a mixed acid feedstock will contain a mixture of isomers unlike the single isomer blends produced by mixing esters of a single acid.

Suitable straight chain acids which may be used to form the esters include the straight chain $C_5$, $C_6$, $C_7$, $C_8$, and $C_9$ acids. Suitable branched chain acids which may be used to form esters blended with the esters derived from the straight chain acids include singly branched and multiply branched chain acids such as 2-methyl butyric acid, 2-methyl hexanoic acid, 2-ethyl hexanoic acid, iso-$C_5$, iso-$C_8$ and iso-$C_9$ acids, mixtures of acids such as the oxo-acids ($C_8$—$C_9$) and highly branched acids such as 3,3,5-trimethyl hexanoic acid.

Free hydroxy groups are undesirable on the esters. Preferably, the esters contain fewer than 5% free hydroxy groups, more preferably fewer than 2.5% free hydroxy groups, and most preferably fewer than 1% free hydroxy groups. Ideally, the di- and triesters contain no or essentially no free hydroxy groups. The esterification of the alcohol with the acids may be carried out using conventional procedures with, if desired, conventional esterification catalysts.

The lubricant may be made up wholly or partly from these hindered esters. Normally, it will consist essentially of one or more of these esters blended to obtain the desired characteristics, e.g. viscosity, wear resistance, hydrolytic stability and miscibility. In some instances, it may be desirable to blend the present esters with other lubricnts, especially other esters which have been found suitable for use in refrigerant systems with HFC refrigerants. Lubricant blends of this type may typically contain up to about 5%, 10%, 15% or even more of the additional refrigeration oils. The lubricant composition may contain as much as 50%, of the additional refrigeration oils, e.g. 35%, 25%, or 20% of the other oil.

The preferred additional refrigeration oil is a second ester.

The second ester preferably is an ester of a branched chain fatty acid and a neopentyl polyol. Some suitable examples of neopentyl polyols are shown in the structure below wherein $R_1$ and $R_2$ independently constitute any of $HOCH_2$—, $(HOCH_2)_3CCH_2OCH_2$—, $CH_3$—, or $CH_3CH_2$—:

$$R_1C\begin{array}{c}CH_2OH\\|\\-CH_2OH\\|\\R_2\end{array}$$

| $R_1$ | $R_2$ | Name |
|---|---|---|
| $HOCH_2$— | $HOCH_2$— | Monopentaerylthritol |
| $(HOCH_2)_3CCH_2OCH_2$— | $HOCH_2$— | Dipentaerylthritol |
| $HOCH_2$— | $CH_3$— | 1,1,1-Trimethylolethane |
| $HOCH_2$— | $CH_3CH_2$— | 1,1,1-Trimethylolpropane |
| $CH_3$— | $CH_3$— | Neopentyl glycol |

The branched acyl group of the second ester is preferably derived from an alkanoic acid having a total of 4–18 carbon atoms and at least one branch. At least one branch is preferably at the 2 position of the acyl group. The branch or branches preferably comprise 1–4 carbon atoms, and include methyl, ethyl, n-propyl, i-propyl, n-butyl, i-butyl, sec-butyl, and t-butyl groups. A preferred branched acyl group is the 2-ethylhexyl group.

As with the hindered alcohol of the first ester, it is preferred that the final ester should contain significantly less than 5%, e.g. less than 2.5%, and most preferably less than 1% of free hydroxy groups. Ideally, none or essentially none of the hydroxy groups of the neopentyl polyol is free.

Preferably, at least about 80 number percent, more preferably at least about 90 number percent of the acyl groups in the second ester are branched in order to give the best hydrolytic stability, miscibility as well as conferring an increase in viscosity. For best results, all the acyl groups in the second ester are branched chain. The proportions of the two esters should be chosen so that the desired overall balance of lubricant properties is obtained. The use of the second ester with branched chain components may be useful to provide the desired viscosity without an unacceptable losses of wear performance, hydrolytic stability and miscibility. Normally, the first ester component will comprise at least 70 weight percent, preferably at least 80 weight percent of the blend.

Some suitable examples of second esters include the 2-ethylhexanoic acid ester of monopentaerythritol and the 2-ethylhexanoic acid derivative of dipentaerythritol. Technical grades of these alcohols may be used, containing, for example, up to about 12% dipentaerythritol in the monoalcohol and up to about 12 percent monopentaerythritol in the technical grade dipentaerythritol.

Similarly, the 2-ethylhexanoic acid esters of 1,1,1-trimethylol-propane and 1,1,1-trimethylolethane have viscometric properties which would make them usable as second ester components.

Other additional refrigeration oils may be added to the ester of a hindered alcohol or to the mixture of the ester of the hindered alcohol and the second ester. The additional refrigeration oils may be selected, for example, from naphthenic mineral oils, alkylbenzenes with 1 to 6 $C_8$–$C_{20}$ alkyl groups (preferably $C_8$–$C_{16}$ alkyl); poly α-olefins (PAOs) preferably having a viscosity of 2–6 cSt (40° C.) and the polyalkylene glycols (PAGs) comprising ethylene oxide, propylene oxide or butylene oxide units.

These additional refrigeration oils may be present in the lubricants in amounts up to about 50%, but since the excellent wear performance of the present lubricants stems from the use of the straight chain acid/hindered alcohol esters, the amount of the second lubricant should normally be limited and in most cases, it will not exceed about about 25%, preferably about 20%, of the total lubricant blend, typically being in the range about 10% to 20% of the total ester.

The lubricants described above exhibit a superior combination of properties when used with the refrigerants described below in compression refrigeration units. The refrigerants include saturated hydrocarbons having 1–4, preferably 3–4 carbon atoms; hydrofluorocarbons having 1 or 2 carbon atoms and 1–6 fluorine atoms; or a mixture of such hydrocarbons and/or such hydrofluorocarbons with a hydrochlorofluorocarbon having 1–2 carbon atoms, 1–5 fluorine atoms and 1–2 chlorine atoms.

The preferred refrigerants are the HFCs (hydrofluorocarbons), especially for small hermetic units. For larger units hydrocarbons (propane, butane) may be used. The HFCs may be used, if environmentally acceptable, in azeotropic blends with CFCs, for example, in a blend of HFC (hydrofluorocarbon) with up to about 50, preferably up to about 25, more preferably up to about 10 number percent of a CHFC (hydrochlorofluorocarbon) having 1–2 carbon atoms, 1–5 fluorine atoms, and 1–2 chlorine atoms.

Suitable hydrofluorocarbon refrigerants include 1,1,2,2-tetrafluoroethane (R-134), 1,1,1,2-tetrafluoroethane (R-134a), 1,1,2-trifluoroethane (R-143), 1,1,1-trifluoroethane (R-143a), 1,1,1,2,2-pentafluoroethane (R-125), 1,1-difluoroethane (R-152a), difluoromethane (R-32) and trifluoromethane (R-23).

Suitable hydrocarbon refrigerants include one or both of propane or butane.

Hydrochlorofluorocarbon (CFC) refrigerants which may be used in blends with the HFCs if enironmentally acceptable include monochlorodifluoromethane(R-22),1-chloro-1,1-difluoroethane (R-142b), trichloromonofluoromethane (R-11), dichlorodifluoromethane (R-12), monochlorotrifluoromethane (R-13), monochloro-trifluoromethane (R-13) and monochloropentafluoroethane (R-115).

The hindered alcohol, neopentyl polyols, and carboxylic acids required for preparing the first and second esters as well as the refrigerants are readily available from commercial sources or can be prepared from readily available materials using techniques well known to those having ordinary skill in the art.

The working fluids in compression refrigeration system comprise a lubricant and a refrigerant. The amount of the lubricant in any system is dependent on the size of the compressor, with the amount of refrigerant being dependent on the amount of refrigerant, on the other hand, depends on factors such as, for example, the efficiency, size and type of the system as well as on other system design variables, so that the proportions of lubricant and refrigerant will vary according to the system.

The working fluid preferably remains substantially homogeneous at temperatures as low as 0° C., preferably as low as –20° C., more preferably as low as –40° C., and most preferably as low as –60° C. Homogeneity is also preferably maintained at temperatures up to 40° C. or even higher.

Miscibility is determined for present purposes by following the procedure of the the ANSI/ASHRAE Floc Point Standard (ANSI/ASHRAE 86-1994) with R-134a as the selected refrigerant and determining the temperature at which a mixture of 10% by volume of lubricant and 90% by volume of the refrigerant becomes visibly immiscible (rather than floc as in the ANSI/ASHRAE Standard). The miscibility temperatures of the lubricants of the invention are preferably lower than about –35° C. (with R-134a), preferably less than about –40° C., and more preferably less than about 45° C.

Wear resistance is conveniently measured by the Four Ball wear test. The test procedure used in this specification conforms to the ASTM D 4172 method. The test conditions include 1,200 rpm, 20 kg load, 60° C., and 60 minutes. The average Four Ball wear volume (as indicated in the test) for acceptable lubricants is preferably less than about 1 $\mu m^3$, more preferably less than about 0.8 $\mu m^3$, and most preferably less than about 0.7 $\mu m^3$.

A third criterion for useful working fluid compositions is hydrolytic stability. For the purpose of this specification, hydrolytic stability is measured by sealing a test composition having a known total acid number (TAN) along with 5,000 ppm (0.5 weight percent) of water in a tube containing 0.5 gram iron powder under nitrogen. The sealed tube is subjected to temperatures of 150° C. for 72 hours. The tube is opened and the total acid number (TAN) of the resulting fluid is measured in accordance with ASTM D 664. The working fluids of the present invention preferably have ΔTAN less than about 1 mg KOH/g, preferably less than about 0.5 mg KOH/g, and more preferably less than about 0.2 mg KOH/g.

The complete test protocol for hydrolytic stability is as follows:

Iron powder (0.05 g) is added to a necked down test tube, making sure that all of the powder goes to the bottom, using nitrogen gas or a very fine piece of wire to remove powder. Oil (9.95 g) is added to the tube, preferably using a syringe with a long needle. The air is evacuated from the tube by connection to a vacuum manifold to bring the pressure to no more than 0.05 torr. The evacuated tube is then flooded with nitrogen and 0.05 ml of demineralized water is added to the tube, replacing the tube when the water is added. The bottom part of the tube is then frozen in liquid nitrogen and the air evacuated again while the tube contents are frozen, the pressure being reduced to no more than 0.05 Torr. The neck of the tube is then sealed with a torch while the contents are held frozen and the tube is under vacuum. The tube is then placed in an oven at 150° C. for 72 hours. After the tube is allowed to cool, it is broken open, the contents filtered and submitted to a TAN measurement (ASTM D 664) to determine the change in total acid number (ΔTAN).

The present ester lubricants have a hydrolytic stability under these test conditions of less than 1 (ΔTAN, mg KOH/g).

The lubricants need to meet specifications for viscosity in order to avoid viscosity-miscibility problems which are likely to arise in heat exchangers if significant differences in viscosity between the refrigerant and the lubricant arise. Normally, the lubricants are required to have a kinematic viscosity 4–20 (40° C.), and more usually in the range of 4–15 cSt, except when hydrocarbon refrigerants are used, when the upper limit on the viscosity specification may typically be as high as 32 cSt.

The preferred lubricants according to the present invention preferably have miscibility temperatures less than 35° C., Four Ball wear volume less than 1 μm³, and hydrolytic stability (ΔTAN) less than 1 mg KOH/g. as measured in accordance with the methods described above. It is particularly preferred that the lubricant has, in addition, a kinematic viscosity of 4 to 15 cSt in addition to the above three properties.

Although additives may be added to the lubricants, it is preferred to use the present lubricants with no additives or with only a minimal amount if required in special circumstances, e.g. if the metallurgy of a particular system requires a metal passivator. Small amounts of antioxidants such as dibutyl para-cresol (DBPC) may be added as storage stabilizers without affecting the performance although it is preferred to omit them if distribution practices permit. The superior antiwear performance of the present esters with chlorine-free refrigerants enables the use of anti-wear additives to be eliminated.

The compositions of the invention are suitable in various types of heat transfer units, and especially those of the mechanical vapor recompression type. Such units include, for example, refrigerators, air conditioners, and heat pumps. In such units, a refrigerant evaporates at low pressure absorbing heat from the environment. The resulting vapor is transferred to a compressor, where it is compressed, and then to a condenser, where it is condensed, thereby emitting heat to the environment. The condensate is then transferred to an expander, such as an expansion valve, and then back to the evaporator, completing the cycle. The mechanical energy required for compressing the vapor and pumping the fluid is provided by any suitable source of energy, such as, for example, by an electric motor or an internal combustion engine. The present lubricant and lubricant/refrigerant combinations provide superior properties when used in such units.

The invention further provides a method for lubricating refrigeration units that use refrigerants as described above. The method comprises contacting moving parts of the unit with a lubricant of the invention. The method is particularly advantageous for lubricating the compressors of vapor compression cycle heat transfer units.

EXAMPLES

Example 1

Preparation of 2,2,4-trimethyl-1,3-pentanediol di-n-heptanoate

Into a 3-liter four neck flask equipped with stirrer, thermometer, a nitrogen inlet tube, Dean-Stark trap and condenser was charged 492 grams (3.36 moles) of 2,2,4-trimethyl-1,3-pentanediol; 963 grams n-heptanoic acid (7.40 moles) and 0.1 wt. percent of dibutyl tin oxide as catalyst. The reaction was carried out under reflux conditions at 220° C. to a hydroxyl value <2.0. The excess heptanoic acid was stripped under reduced pressure for a TAN <1.0. The ester was subsequently treated with concentrated caustic, stripped and filtered to yield 1170 grams of 2,2,4-trimethyl-1,3-pentanediol di-n-heptanoate.

Example 2

Properties of Esters

The esters below show the physical and chemical properties of some esters (tested with 0.1 percent DBPC as a storage stabilizer). Esters A–F represent esters of hindered alcohols. Esters H–L represent second esters suitable for mixing with the hindered alcohol esters to form to form lubricant blends.

| Ester | Polyol | Acid (1) | Acid (2) | Visc. 40° C. (cSt) | Misc. R-134a, °C. | Wear 4-Ball volume (μm³) | Hydro. Stab. ΔTAN |
|---|---|---|---|---|---|---|---|
| A | TMPD | nC$_5$ | — | 6.9 | <−65 | 0.4 | 0.4 |
| B | TMPD | nC$_7$ | — | 7.6 | −40 | 0.63 | 0.43 |
| C | TMPD | nC$_9$ | — | 11.3 | >25 | 0.36 | 0.5 |
| D | TMPD | i-C$_8$ | — | 13.2 | −54 | 3.33 | 0.38 |
| E | TMPD | iC$_9$ | — | 18.9 | −45 | 3.72 | 0.11 |
| F | TMPD | nC$_7$ (60%) | iC$_9$ (40%) | 15.4 | 45 | 3.37 | 0.24 |
| G | NPG | nC$_7$ (25%) | iC$_9$ (75%) | 10.1 | <−60 | 4.69 | 1.76 |
| H | NPG | nC$_7$ | — | 5.6 | −65 | 2.01 | 2.15 |
| I | NPG | 2-EHA | — | 7.6 | <−65 | 3.72 | 0.09 |
| J | NPG | 2-EHA (50%) | iC$_9$ (50%) | 9.7 | <−65 | 4.90 | 0.34 |
| K | NPG | iC$_9$ | — | 13.2 | −36 | 4.90 | 0.4 |
| L | TME | 2-EHA | — | 22.3 | −43 | 3.72 | 0.11 |

Code:
TMPD = 2,2,4-trimethyl-1,3-pentanediol
NPG = neopentyl glycol
TMP = trimethylol propane
TME = trimethylol ethane
nC$_6$ = n-pentanoic acid
nC$_7$ = n-heptanoic acid -continued

| Ester | Polyol | Acid (1) | Acid (2) | Visc. 40° C. (cSt) | Misc. R-134a, °C. | Wear 4-Ball volume ($\mu m^3$) | Hydro. Stab. ΔTAN |
|---|---|---|---|---|---|---|---|

2 EHA = 2-ethylhexanoic acid
$iC_9$ = 3,5,5-trimethylhexanoic acid

The results above show that ester viscosity increases with acyl chain length whereas miscibility (R-134a) decreases (Esters A–C). Wear resistance is markedly better for the straight chain esters (A–C) as compared to the branched chain esters (D–F) although hydrolytic stability is better for the branched cabin materials.

With the neopentyl polyol esters, the hydrolytic stability is better but the wear performance is notably worse, indicating the difficulty of attaining an optimum combination of performance characteristics.

Example 3

Lubricants from Ester Blends

A series of TMPD ester lubricants were made up from blends of straight and branched chain $C_7$ to $C_9$ acid esters of TMPD. The wear performance test results (with 1 wt. pct. added DBCP) are given below.

| Ester | n-$C_7$ acid | i-$C_8$ acid | n-$C_9$ acid | i-$C_9$ acid | 4-Ball Wear Vol., $\mu m^3$ |
|---|---|---|---|---|---|
| M | 40 | 60 | | | 1.69 |
| N | 60 | | | 40 | 3.53 |
| O | 80 | | | 20 | 0.70 |
| P | 60 | | 20 | 20 | 0.69 |
| Q | 60 | | 40 | | 0.46 |

The results given above show that there wear performance is correlated with the proportion of straight chain estergroups, with wear scar volumes below 1 being achieved with at least 80 percent straight chain ester groups.

Example 4

Lubricant Based on Esters of TMPD with Mixed Acid Feedstocks

A series of lubricants were made by esterifying TMPD with mixed acid feedstocks, using the esterification method of Example 1. Since TMPD contains two esterifiable hydroxyl groups, the esters in each case will contain a mixture of isomers unlike the single isomer blends produced by mixing esters of a single acid (as in Example 3). The test results (with 0.1% DBPC) are set out below.

| Ester Blend | n-$C_7$ acid | i-$C_8$ acid | n-$C_9$ acid | i-$C_9$ acid | 4-Ball Wear Vol., $\mu m^3$ | Hydro. ΔTAN | KV 40° C., cSt. | Misc, R-134a, °C. |
|---|---|---|---|---|---|---|---|---|
| R | 64 | | 18 | 18 | 0.40 | 0.57 | 8.94 | -30 |
| S | 64 | 18 | | 18 | 0.40 | 0.53 | 9 | -35 |
| T | 20 | | | 80 | 3.37 | 0.24 | 15.38 | -45 |
| U | 60 | | 40 | | 1.59 | 0.49 | 10.28 | -42 |

Example 5

Lubricant Based on Mixture of Ester of Hindered Alcohol and Second Alcohol

A mixture of 80% of 2,2,4-trimethylpentane-1,3-diol di-n-heptanoate (see Example 1) and 20% of the tetraester of monopentaerythritol and 2-ethylhexanoic acid (with 0.1% DBPC) exhibited the following physical and chemical properties:

| Viscosity @ 40° C., cSt | 9.87 |
|---|---|
| Viscosity @ 100° C., cSt | 2.69 |
| Viscosity Index | 110 |
| Pour Point, °C. | <-54 |
| Flash Point (D 92), °C. | 196 |
| TAN, mg KOH/g | <0.05 |
| R-134a, miscibility temp. | -37 |
| 4-Ball Wear Volume ($\mu m^3$) (1200 rpm/20 Kg/60 min/60° C.) | 0.90 |
| Hydrolytic Stability (ΔTAN) (150° C./72 Hr(0.5 g Fe Cat./ 5000 ppm Water) | 0.58 |
| Falex Failure load, lb | 1188 |

Example 6

Lubricant Based on Mixture of Esters

A mixture of 72% of 2,2,4-trimethylpentane-1,3-diol di-n-heptanoate (see Example 1) and 28% of the mixed esters of monopentaerythritol with $C_5$, $C_7$, and $C_9$ acids (28 percent n-$C_5$, 14 percent i-$C_5$, 42 percent n-$C_7$, 16 percent i-$C_9$) exhibited the following physical and chemical properties (with 0.1% DBPC):

| Viscosity @ 40° C., cSt | 10.9 |
|---|---|
| Viscosity @ 100° C., cSt | 2.87 |
| Viscosity Index | 111 |
| Pour Point, °C. | <-54 |
| Flash Point (D 92), °C. | 200 |
| TAN, mg KOH/g | <0.05 |
| R-134a, miscibility temp. | -44 |
| 4-Ball Wear Volume ($\mu m^3$) (1200 rpm/20 Kg/60 min/60° C.) | 4.90 |
| Hydrolytic Stability (ΔTAN) (150° C./72 Hr(0.5 g Fe Cat./ 5000 ppm Water) | 2.46 |

Comparison of these results with those of Example 3 shows that both the wear resistance and the hydrolytic stability have decreased significantly with the greater content of branched chain esters in the total fluid.

We claim:

1. A composition suitable for use in a vapor compression refrigeration unit, the composition comprising a lubricant and a refrigerant comprising a hydrofluorocarbon;

the lubricant comprising an ester of a hindered alcohol and at least one $C_4$–$C_{18}$ fatty acid in which at least 70 numb percent of acyl groups from the fatty acid are straight chain acyl groups, wherein the hindered alcohol comprises at least one primary alcohol group and at least one secondary alcohol group, wherein no carbon atom that bears a hydroxy group is adjacent to either a methylene group or a methyl group, and wherein the lubricant has a 4 Ball Wear Volume ($\mu m^3$) of less than 1.

2. The composition of claim 1 in which the lubricant has the following properties:

R-134a miscibility temperature: Less than −35° C.
Hydrolytic stability (ΔTAN,mj KOH/g): Less than 1.

3. The composition of claim 1 wherein the lubricant has a viscosity at 40° C. from 4 to 15 cSt.

4. The composition of claim 1 which comprises an ester of a hindered dihydric or trihydric alcohol and at least one $C_4$–$C_{18}$ fatty acid, where the hindered alcohol comprises at least one primary alcohol group and at least one secondary alcohol group, and wherein no carbon atom that bears a hydroxy group is adjacent to either a methylene group or a methyl group.

5. The composition of claim 1 in which at least 80 number percent of the acyl groups from the fatty acid(s) are straight chain acyl groups.

6. The composition of claim 1 in which the fatty acid(s) is/are $C_5$–$C_9$ acids.

7. The composition of claim 4 in which the esters are derived from a mixture of at least 80 weight percent straight chain $C_5$–$C_9$ fatty acid(s) and 20 weight percent or less branch chain $C_5$–$C_9$ fatty acids.

8. The composition of claim 4 in which the alcohol comprises 2,2,4-trimethylpentane-1,3-diol.

9. The composition of claim 1 in which the refrigerant comprises a hydrofluorocarbon having 1–2 carbon atoms and 1–6 fluorine atoms.

10. A composition according to claim 9 wherein the refrigerant comprises 60–100 weight percent of the hydrofluorocarbon.

11. A composition according to claim 9 wherein the refrigerant comprises R-134a.

12. A composition according to claim 9 wherein the refrigerant comprises 60–100 weight percent of R-134a.

13. A composition according to claim 9 wherein the refrigerant consists essentially of 1,1,1,2-tetrafluoroethane.

14. A composition according to claim 9 further comprising up to 50% of a second ester of a neopentyl polyol.

15. A composition of claim 14 in which the neopentyl polyol ester is derived from a branched chain fatty acid having 5–12 carbon atoms.

16. A composition according to claim 15 wherein the branched fatty acid is 2-ethylhexanoic acid.

17. A composition according to claim 15 comprising up to 25% of the second ester.

18. A composition according to claim 14 wherein the neopentyl polyol is monopentaerythritol.

19. A method for lubricating a vapor compression heat transfer unit comprising contacting moving parts of the unit with the composition of claim 9.

20. In a vapor compression cycle heat transfer unit comprising a lubricant, a refrigerant, a means for evaporating the refrigerant, a means for compressing the refrigerant, a means for condensing the refrigerant, and a means for expanding the refrigerant;

the improvement wherein the lubricant is the lubricant of claim 1 and the refrigerant is hydrofluorocarbon.

* * * * *